(12) United States Patent
Suy et al.

(10) Patent No.: US 8,762,174 B2
(45) Date of Patent: Jun. 24, 2014

(54) METHOD AND COMPUTER MEANS FOR CHOOSING SPECTACLE LENSES ADAPTED TO A FRAME

(75) Inventors: Saurphéa Suy, Charenton-le-Pont (FR); Mélanie Vichara Bopha Net, legal representative, Paris (FR); Vincent Samreth Viriya Net, legal representative, Paris (FR); Sébastien Chailley, Charenton-le-Pont (FR); Luc Martin, Charenton-le-Pont (FR); Frédéric Dubois, Charenton-le-Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 69 days.

(21) Appl. No.: 12/811,070

(22) PCT Filed: Dec. 23, 2008

(86) PCT No.: PCT/EP2008/068276
§ 371 (c)(1),
(2), (4) Date: Jun. 28, 2010

(87) PCT Pub. No.: WO2009/065966
PCT Pub. Date: May 28, 2009

(65) Prior Publication Data
US 2010/0293192 A1    Nov. 18, 2010

(30) Foreign Application Priority Data

Dec. 28, 2007 (EP) .................. 07301756

(51) Int. Cl.
*G06Q 50/24* (2012.01)
(52) U.S. Cl.
USPC ........................................... 705/3
(58) Field of Classification Search
USPC ............................................ 705/2, 3
See application file for complete search history.

(56) References Cited

U.S. PATENT DOCUMENTS

| 5,121,548 | A | | 6/1992 | Daboudet et al. |
| 5,926,247 | A | * | 7/1999 | Kimura .......................... 351/41 |
| 5,983,201 | A | * | 11/1999 | Fay ............................. 705/26.5 |
| 6,637,880 | B1 | * | 10/2003 | Yamakaji et al. ......... 351/159.75 |
| 6,811,260 | B2 | | 11/2004 | Yamakaji |

(Continued)

FOREIGN PATENT DOCUMENTS

| EP | 1 475 187 | 11/2004 |
| EP | 1 767 983 | 3/2007 |

(Continued)

*Primary Examiner* — Michael Fuelling
(74) *Attorney, Agent, or Firm* — Cozen O'Connor (57) ABSTRACT

A method and a computer system and its components for providing spectacles adapted to a future wearer. The method comprises the steps of: inputting in a computer system a first set of data (F1) related to the wearer, comprising at least a prescription of the wearer, inputting in the computer system a second set of data (F2) related to a spectacle frame chosen by the wearer. The computer system is provided with processing means for outputting, on the basis of the first and second sets of data, at least one set of data (S1, S2, ..., SN) characterizing a pair of ophthalmic lenses adapted to the wearer and the chosen frame.

6 Claims, 6 Drawing Sheets

(56) References Cited

U.S. PATENT DOCUMENTS

| | | |
|---|---|---|
| 6,962,669 B2 * | 11/2005 | Foreman et al. ............. 264/1.36 |
| 7,108,373 B2 | 9/2006 | Yamakaji |
| 7,139,636 B2 * | 11/2006 | Foreman et al. ............. 700/198 |
| 7,219,075 B2 | 5/2007 | Kobayashi |
| 7,222,091 B2 * | 5/2007 | Yoshida ....................... 705/26.8 |
| 2002/0176052 A1 | 11/2002 | Ueno |
| 2003/0090625 A1 | 5/2003 | Izumitani et al. |
| 2004/0004633 A1 | 1/2004 | Perry et al. |
| 2004/0064376 A1 * | 4/2004 | Yoshida ......................... 705/26 |
| 2007/0118428 A1 * | 5/2007 | Akiyama et al. ................ 705/26 |

FOREIGN PATENT DOCUMENTS

| | | |
|---|---|---|
| JP | 2006-163441 | 6/2006 |
| WO | WO 02/088828 | 11/2002 |
| WO | WO 2007/017766 | 2/2007 |

* cited by examiner

METHOD AND COMPUTER MEANS FOR CHOOSING SPECTACLE LENSES ADAPTED TO A FRAME

RELATED APPLICATIONS

This is a U.S. national stage of application No. PCT/EP2008/068276, filed on Dec. 23, 2008 and claims priority on European application No. 07301756.8, filed on Dec. 28, 2007, the entire content of which is hereby incorporated by reference.

FIELD OF THE INVENTION

The present invention relates to a method and a computer system and its components for providing spectacles adapted to a future wearer.

BACKGROUND OF THE INVENTION

Usually, a person needing to wear spectacles and having thus a prescription filled by an ophthalmologist or by another authorized eye care professional goes to the premise of an optician. The optician, on the basis of the aforesaid prescription, firstly determines a pair of lenses suiting the best the prescription and, in a second time, advises the future wearer to choose a spectacle frame amongst a limited choice of frames adapted to the pair of lenses.

However, some future wearers of spectacles are incited to choose the best looking frame rather than the pair of lenses suiting the best their prescription. These future wearers can be thus frustrated for being proposed such a limited choice of frames. In addition, in optician premises, the sale person is not always capable of doing a proper frame recommendation to the wearer. When the choice of frame is not adapted to the selected lenses, the resulting spectacles may be totally unaesthetic and generates huge client dissatisfaction.

SUMMARY OF THE INVENTION

One object of the present invention is to improve the situation.

To this end, one aspect of the present invention is directed to a method implemented by computer means, comprising the steps of:
  inputting in a computer system a first set of data related to the wearer, said first set of data comprising at least a prescription of said wearer,
  inputting in said computer system a second set of data related to a spectacle frame chosen by the wearer,
and wherein said computer system is provided with processing means for outputting, on the basis of said first and second sets of data, at least one set of data characterizing a pair of ophthalmic lenses adapted to said wearer and said frame.

The present invention proposes a method implemented by a computer system, for characterizing pairs of ophthalmic lenses of spectacles adapted to a future wearer of said spectacles, wherein the method comprises the steps of:
  inputting into the computer system, at an input interface, a first set of data related to the wearer, said first set of data comprising at least a prescription of said wearer,
  inputting in said computer system a second set of data related to a spectacle frame chosen by the wearer,
  determining, by a processor of the computer system based on the second set of data, front face general curvatures of a first and second opening of the spectacle frame,
  outputting, at an output interface based on said first and second data processed by the processor of the computer system and the front face general curvatures, from a processor of said computer system at least one set of data characterizing a pair of ophthalmic lenses adapted to said wearer and said spectacle frame, and
  inputting, at the input interface, at least one criterion for choosing said pair of ophthalmic lenses,
  wherein the processor is configured to output, based on the first and second data sets, a list of data sets characterizing pairs of ophthalmic lenses adapted to the wearer and the spectacle frame, said list being ordered according to said at least one criterion.

It will be thus understood that, on the contrary of the prior art approach, the chosen frame is an input data of the system, while the suitable pair of lenses is an output data. The future wearer may choose the best looking frame and the computer system is able to output a suitable pair of lenses suiting both the wearer prescription and the frame choice. Of course, the computer system can be parameterized so as to give more or less importance to the frame choice or to the wearer optical comfort (according, among others, to the wearer prescription) for selecting a suitable pair of lenses, as it will be described hereafter. Therefore, the invention proposes, in an embodiment, to release the optical constraints, such as the constraints of the lenses optical performance (relatively for example to the aberrations and/or the optical deformations) in order to obtain more possible choices of lenses (for example a list of different lenses). Amongst those choices, the optician can chose the lenses which are the most adapted to the frame or to the price wished by the wearer, or a combination of these two criteria.

DETAILED DESCRIPTION OF THE INVENTION

In the embodiment described hereafter by way of an example, the method is implemented to aid an optician to select a pair of ophthalmic lenses which suits chosen frame parameters and wearer data (including at least the wearer prescription). Once those ophthalmic lenses are selected, accurate measurements are performed on the frame to provide to the wearer and the aforesaid ophthalmic lenses are edged according to these frame measurements.

Figure 1:
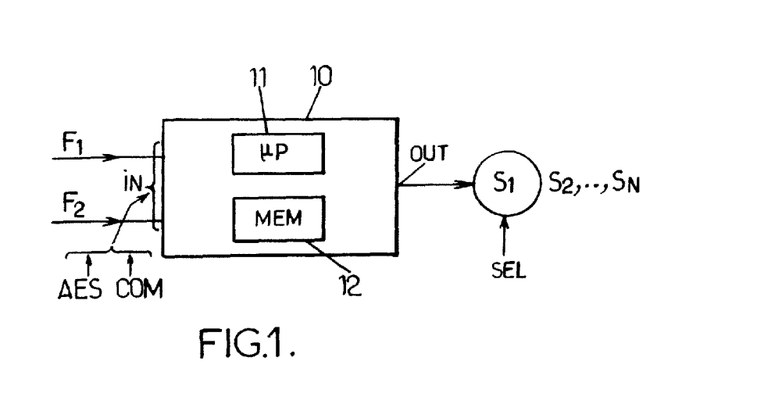
FIG. 1 schematically shows an example of a computer system for implementing an embodiment of the invention.

With reference to FIG. 1, the present invention aims at a method for providing spectacles adapted to a future wearer and also at a computer system comprising means for implementing the method, such as:

an input interface IN receiving at least
a first data set F1 related to the wearer, comprising at least a prescription of the wearer, and
a second data set F2 related to a spectacle frame F chosen by the wearer,
means (such as a memory MEM and a processor μP) for processing the first and second data sets F1 and F2,
and an output interface OUT, for delivering, on the basis of the first and second data sets, at least one data set S1 characterizing a pair of ophthalmic lenses adapted to the wearer and the frame.

In an advantageous embodiment, at least one criterion is further imputed in the system for choosing the pair of lenses. The computer system is therefore arranged for outputting at least one data set S1 relative to a pair of lenses selected (arrow carrying the reference SEL on FIG. 1) according to the criterion, amongst a plurality of data sets S1, S2, SN relative to respective possible pairs of lenses.

This criterion may be a criterion amongst at least:
an aesthetics AES of the resulting spectacles provided with the finally selected lenses,
a comfort COM provided by the finally selected lenses,
a deformability DEF of the selected frame,
a price PRI of the finally selected lenses.

The comfort criterion COM can include, for example, a wearing comfort that encompass, for example:
the fact that the lenses shall be made in a light material can be a data for satisfying the comfort criterion
the visual comfort as measured by wearer tests and through a minimal change with the wearer previous equipment.
For example, if the wearer previously had progressive multifocal lenses, he may prefer to keep lenses having substantially the same lenses front face curvatures as the former ones.

Figure 6A:
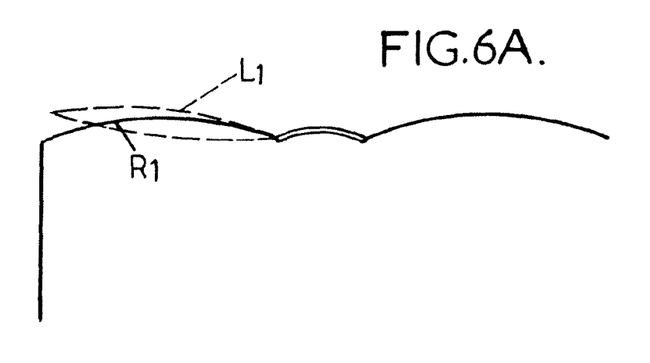
FIGS. 6A and 6B show particular cases where lenses cannot be provided to suit both a prescription and a frame shape.

The aesthetics criterion AES can include, for example, the fact that the lenses front face curvatures substantially fit the curvatures C1, C2 of respective frame openings R1, R2 (FIG. 3B) and do not go beyond the openings (situation of FIG. 6A). The aesthetics criterion AES can include also the fact that each lens L1 should have a substantially abutting edge with a front face surface of a rim H1 delimiting an opening R1 (for example a front face surface of the lens edge substantially in a same plan P1=Q1 as a front face surface of a rim H1, as shown in FIG. 3C). The aesthetics criterion AES may include also the fact that lenses are selected in order to avoid a "globular eye" looking effect.

Another criterion may be also the deformability DEF of the frame in order to force the setting of the lenses in the frame. First, the optician may refuse to take into account the deformability of the frame and if he accepts to force the setting, the level of authorized deformation can be an input for satisfying or not the aforesaid deformability criterion.

In an embodiment described hereafter, the comfort criterion COM and the spectacles aesthetics criterion AES, at least, are imputed both in the computer system. The processing means of the computer system (memory MEM and processor μP) run a computer program having an algorithm which may be represented by the flow chart shown on FIG. 4.

In general terms, the processing means are thus arranged for releasing a constraint related to the comfort criterion COM and for selecting at least one data set relative to a pair of lenses Sj suiting the best the spectacles aesthetics criterion AES, amongst a plurality of data sets S1, S2, ..., SN relative to possible pairs of lenses suiting the comfort criterion COM.

Figure 4:
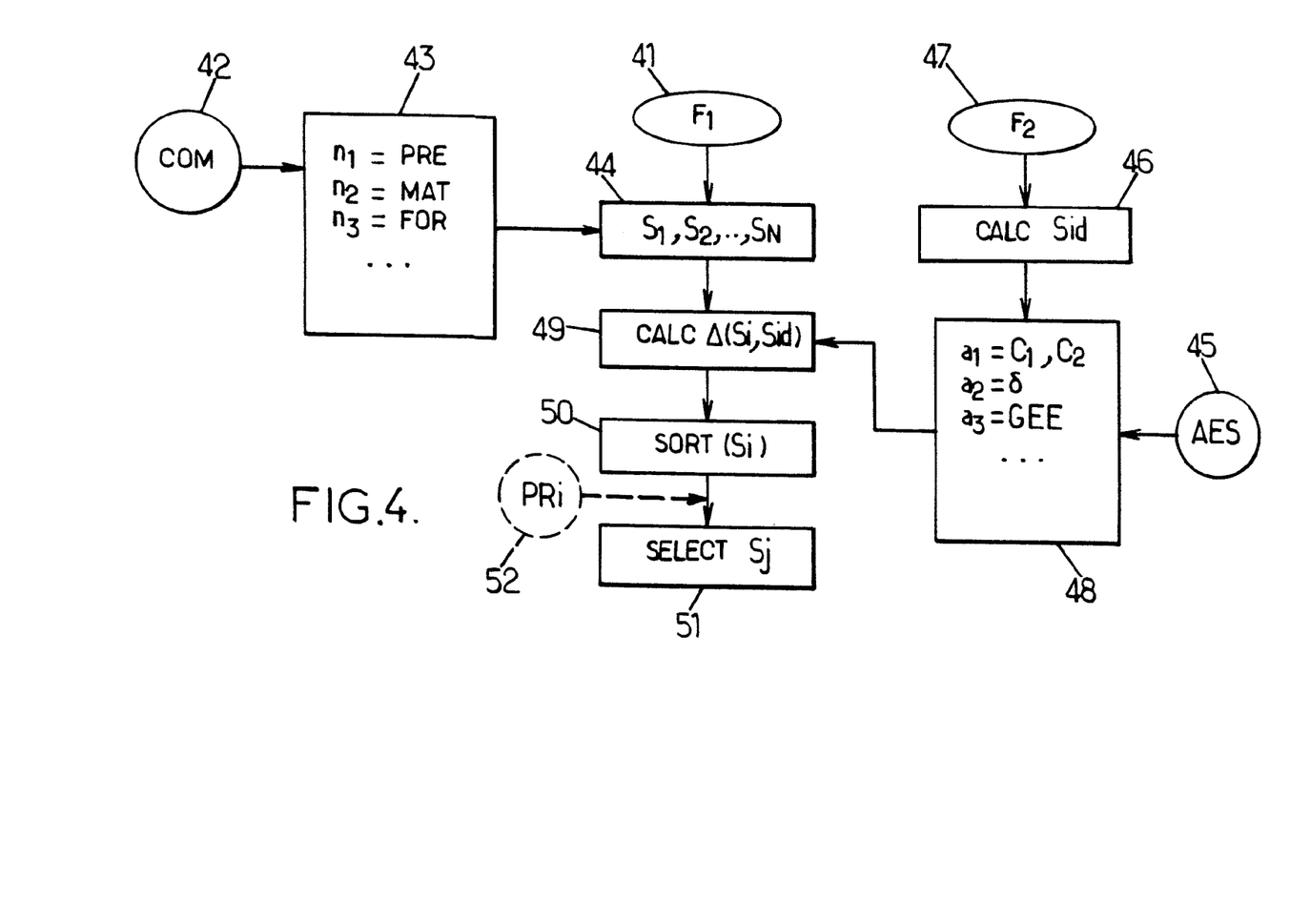
FIG. 4 shows steps of the method according to an embodiment of the invention.

In the example of FIG. 4, in a first step the data of the first set F1 related to the wearer are taken into account first. The first data set F1 includes data relative to the wearer (for example a pupillary distance d of the wearer (FIG. 2), the prescription filled by an ophthalmologist, characteristics of a previous equipment, forecasted usage of the equipment, etc.) and/or data relative to a combination of the wearer w and the chosen frame F (for example heights d'1 and d'2 (FIG. 2) between each pupil of the wearer and a horizontal edge of a rim (called "fitting point height h" according to the specification ISO 13666), distances d1 and d2 (FIG. 2) between each pupil of the wearer and a vertical edge of a rim etc.).

In step 42 of FIG. 4, a first criterion (corresponding to the aforesaid comfort criterion COM) is inputted in the computer system in order to determine at step 43 parameters $n_1$, $n_2$, $n_3$, ..., to take into account (such as the wearer prescription PRE, the lenses material MAT, the existence of former lenses that the wearer had FOR) for listing a pre-selection (at step 44) of a plurality of data sets S1, S2, ..., SN characterizing respective possible pairs of lenses which suit the first criterion.

For example, concerning the wearer prescription parameter $n_1$=PRE, it has been observed by the Applicant that a plurality of front face lens curvatures can suit a same prescription. As a matter of fact, with reference to FIG. 5, a prescription for each eye of the wearer usually defines a couple of values comprising:
a sphere parameter value V1 (according to a short-sightedness or long-sightedness (hypermetropia) level), and
a cylinder parameter value V2 (according to an astigmatism level).

The Applicant observed that, for a same couple of values V1 and V2 (point PRE of FIG. 5), a plurality of front face lens curvatures (or "bases" hereafter) can suit the wearer prescription. Of course, constraints on the optical quality of the lenses have to be slightly released for obtaining more than one single choice of base. In the example given in FIG. 5, it is possible to assign 4 different bases to a same prescription PRE defined by the couple (V1,V2). It is to be appreciated that 6 different bases can be proposed to a moderately short-sighted wearer (point LSS of FIG. 5) without (or with a light) astigmatism.

Figure 5:
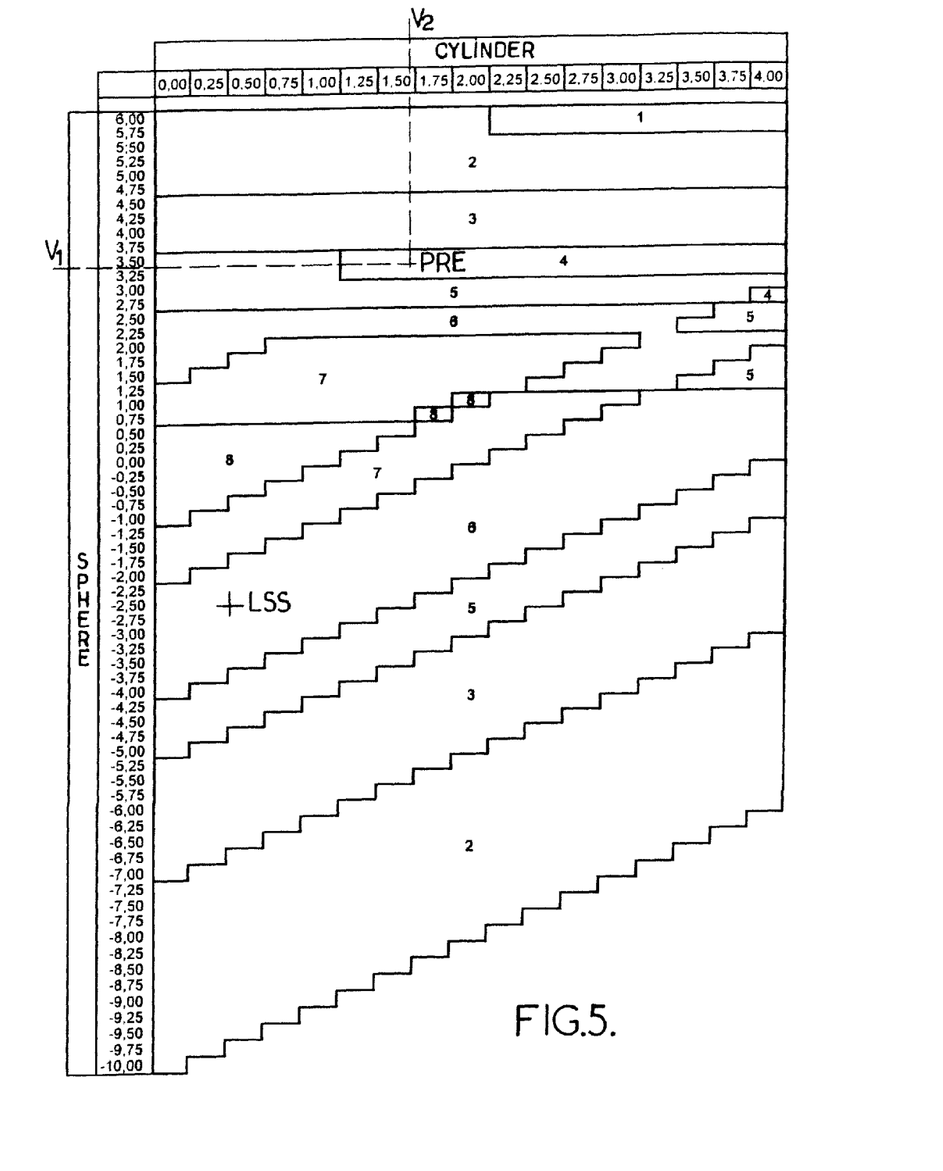
FIG. 5 represents a diagram of lens sphere values versus cylinder values and showing that several possible lens bases can be used for a same wearer prescription.

Of course, those numbers of bases can be lower if the optical quality constraint is increased. Moreover, the rear face shapes of the possible lenses are adapted to the choice of the base made amongst all the possible bases.

It will be thus understood that, amongst N possible bases (with N possibly equal to 8), it can be selected at least one base which suits the best the curvatures C1, C2 of the rims R1,R2 of the chosen frame F.

In the example of embodiment shown in FIG. 4, an ideal lens shape $S_{id}$ is calculated in step 46, on the basis of the second data set F2 related to the chosen frame inputted in the computer system in step 47.

Figure 3A:
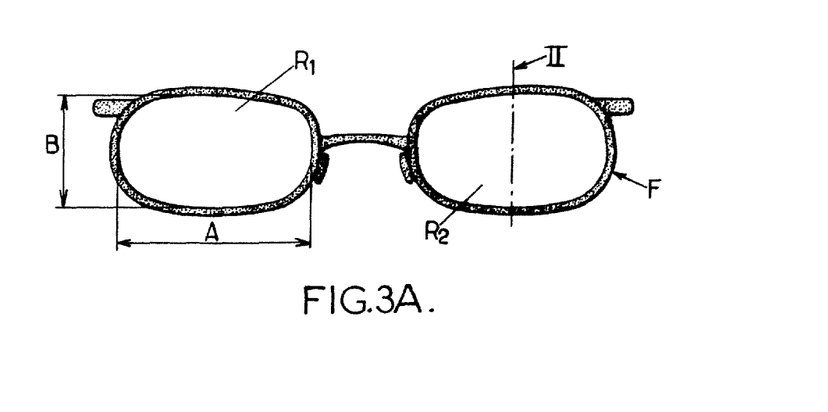
FIGS. 3A, 3B and 3D are respectively a front elevation, a top view and a cross-section view of the chosen frame F (according to the trim mark II of FIG. 3A), showing in particular parameters to measure for constituting the aforesaid second set of data.
Figure 3B:
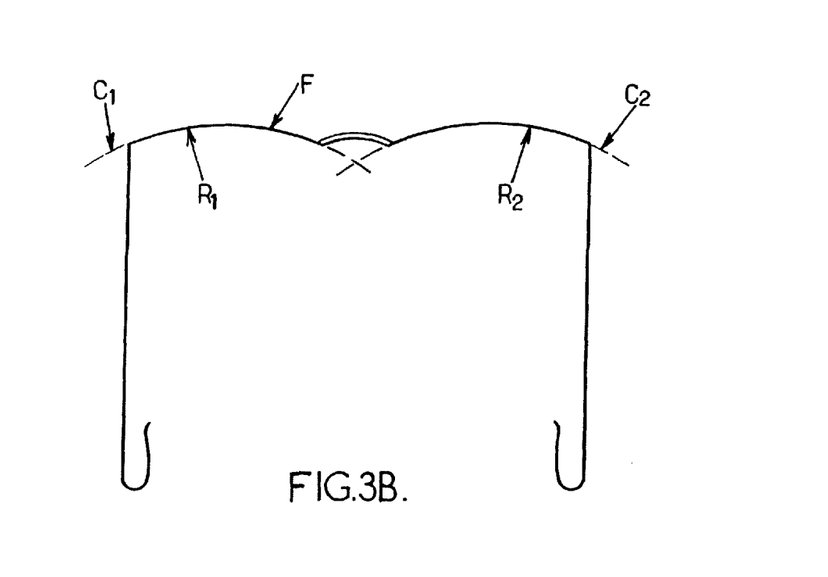
Figure 3C:
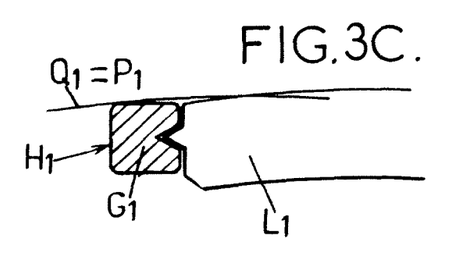
FIG. 3C shows a situation where a lens L1 suit an aesthetics criterion, its edge front face surface being in a same plan as a front face surface of a frame rim H1.
Figure 3D:
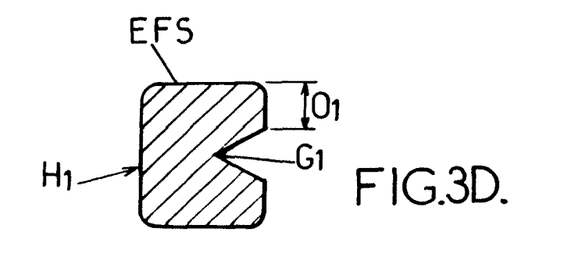

In an embodiment where each spectacle lens L1 is intended to be mounted on a rim delimiting an opening R1 of the frame F, the aforesaid second data set F2 may include for example:
general vertical (height or "B size") and horizontal (width or "A size") dimension values of the openings R1 and R2 of the frame F, as shown in FIG. 3A,
respective front face general curvatures C1, C2 of the first and second openings R1, R2 (FIG. 3B),
dimensions of each rim H1 and notably the average offset distance O1 between the external front side EFS of the rim and the internal groove G1 of the rim H1 (FIG. 3D).

Of course, the type of the chosen frame (for example a fully rimmed frame, or a semi-rimmed frame or a rimless frame) may be also a data to be included in the second data set F2.

In practice, a mechanical sensor (as described for example in document U.S. Pat. No. 5,121,548 published in the name of the Applicant) measures the coordinates of at least 800 points on the surface of the rim grooves. A computer program can calculate the above mentioned data (A, B, C1, C2, etc.). However, in the invention, performing such measurements may not be necessary and all or part of required values (A, B, C1, C2, etc.) can be either captured manually by the optician and/or retrieved from a database where same model/size frame dimensions (previously measured) had been stored. When the optician input data related to the frame chosen by the wearer in the computer system, the computer system, interrogating the database, may output all the data set F2 corresponding to a frame of a same model and a same size.

Thus, the calculated ideal lens shape $S_{id}$ includes a front face general curvature fitting with the front face general curvatures of the frame openings R1, R2. In an embodiment where the lenses are rimed or semi-rimed, the calculated ideal lens shape $S_{id}$ may include also front face edges abutting with respective front faces of the rims (for example in a same plan Q1=P1 as shown in FIG. 3C).

Figure 3E:
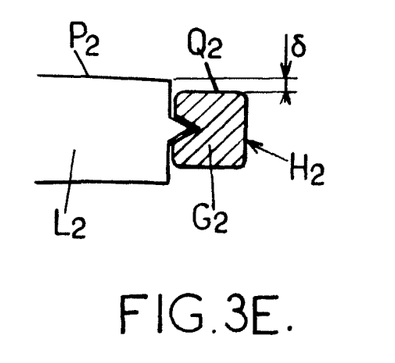
FIG. 3E show a situation where a lens L2 does not suit the aesthetics criterion, its edge front face surface being in a different plan P2 as a front face surface Q2 of a frame rim H2.

With reference to FIG. 4 again, a second criterion (corresponding to the aforesaid aesthetics criterion AES) is inputted at step 45 in the computer system in order to determine at step 48 parameters $a_1, a_2, a_3, \ldots$, to take into account (such as the front face curvatures C1,C2, the distance value δ between the rim surface Q2 and the lens edge front face surface P2 as shown in the general and usual case of FIG. 3E, a globular eye looking effect parameter GEE, etc) for selecting the pair of lenses suiting the best the aesthetics criterion.

Therefore, in general terms, a plurality of lens front face general curvatures (or "bases") can be suitable for a same wearer prescription and releasing the constraint related to the comfort criterion COM enables thus a choice of a plurality of lens front face shapes (bases and "abutting edges"). The processing means of the computer system are advantageously arranged for selecting at least one pair of lenses having a front face shape adapted to the frame for suiting the best the aesthetics criterion.

The parameters $a_1, a_2, a_3$ can be in the form of weighing coefficients intervening in the calculation in step 49 of a distance between each possible lens S1, S2, ..., SN and the ideal lens $S_{id}$.

For example, a possible distance calculation involving a possible pair of lens $S_i$ and the ideally shaped lens $S_{id}$ can be given by an equation of the type:

$$\Delta(S_i, S_{id}) = a_1(C_i - C)^2 + a_2 \delta^2, \text{ where:}$$

$C_i$ is the front face curvature of the lens having the data set $S_i$,

C is the front face curvature of a frame opening,

δ is the distance between the rim front face surface and the edge front face surface of the lens having the data set $S_i$.

It can be decided for example that coefficient $a_1$ is much greater that coefficient $a_2$ for satisfying the aesthetics criterion.

The list S1, S2, ..., SN previously given in step 44 can be thus sorted in step 50 according to the different calculated distance values and the lens having the data set $S_j$ giving the lower calculated distance $\Delta((S_j, S_{id}))$ can be selected in step 51. Of course, according to another criterion such as the price PRI of the lenses, another choice in the list of possible lens (the lenses appearing in second or third in the list) can be made.

Of course, the comfort criterion can intervene again in order to assign mark values to the possible lenses of the sorted list in step 50:

$n_1$: for example from 0 (non suiting the prescription) to 10 (suiting exactly the prescription) for parameter PRE as defined above, $n_2$: for example from 0 (heavy but cheap lens material) to 3 (light but expansive lens material) for parameter MAT as defined above, $n_3$: for example from 0 (base very different from the former lenses one) to 5 (same base as the former lenses one) for parameter FOR as defined above.

The list can be sorted again with these marks in order to select the first choice of the list, for example.

It is to be noted that a variant of embodiment consists in calculating all the distances $\Delta((S_i, S_{id}))$ with all existing lenses without defining a list at step 44. Then, for each possible lens $S_i$, a mark value VSi is given by an equation of the type:

$VSi = n_1(Si) + n_2(Si) + n_3(Si) + \ldots - \Delta((S_i, S_{id}))$, and for example:

VSi=10 (if the lens suits the prescription)+1 (if the lens material is glass)+5 (if the wearer wears spectacles for the first time)$-\Delta(S_1, S_{id})$, or for example VSi=10 (if the lens suits the prescription)+3 (if the lens material is organic)+3 (if the base of lens Si is slightly different from the base of a previous lens)$-\Delta((S_i, S_{id}))$.

Then, all the VSi values are sorted from the greater to the lower and a list of few first choices (for example five choices) is outputted by the computer system.

The maximum values of coefficients $n_1, n_2, n_3, \ldots$, as well as the values of coefficients $a_1, a_2, a_3, \ldots$, can be optimized by way of experiments performed on a multiplicity of types of frame models and sizes. To that end, a feedback of the opticians on the quality of settings of the ordered lenses on the frame can be stored in a database.

It is to be noted that another variant of embodiment consists in asking the optician to input its own relative weights for the aforesaid criterions in order to obtain a sorted list of choices matching his own preference.

Figure 2:
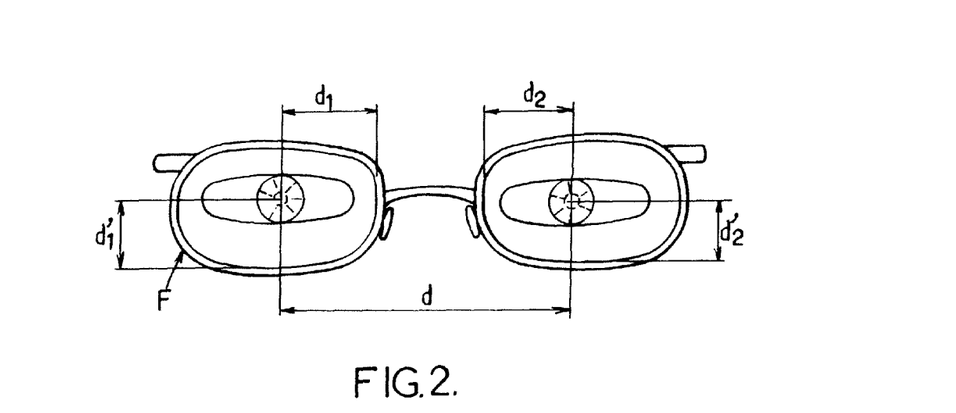
FIG. 2 is a front elevation of the chosen frame F tried by the future wearer, showing in particular parameters to be measured for constituting the aforesaid first set of data.

According to another and preferred embodiment, pairs of lenses which do not respect essential parameters (such as, for example, the wearer prescription) are excluded from the list of possible choices. The list is then sorted according to other parameters such as the lenses weight, the distance δ, the bases difference C1-C, etc. Another possible essential parameter can be the effective diameter of the lenses determined upon the values of the width A and height B (FIG. 3A) of the openings, and the distances d1, d2, d'1, d'2 between the wearer pupils and openings edges of the frame (FIG. 2). If candidate lenses of the list have an effective diameter which is lower than the measured effective diameter, then such candidate lenses are excluded from the list.

Figure 6B:
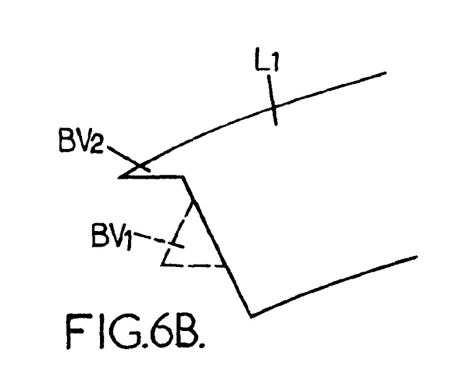

Of course, even if the optician can force the setting of the lenses in a slightly deformable frame, the mark value of the list first choice can be lower than a feasibility threshold. In some cases, the lens base can be such that the lens L1 cannot be mounted in a frame opening R1 (FIG. 6A) or it can be impossible to cut a bevel BV2 on the lens edge to be adapted to a rim of a rimed frame (FIG. 6B where a satisfying bevel BV1 is shown with dashed lines). In other cases (not shown in the drawings), the lens may be too thin and/or too short for being mounted on a large frame, or else too thick so that it may be in contact with the cheek of the wearer.

In these cases, the computer system may output a message for inciting the optician to recommend another frame choice. Advantageously, the processing means are arranged to determine, on the basis of the first and second data sets, a feasibility of lenses having a general geometry fitting respectively with the openings R1, R2 and/or with their rims.

However, it should be noted that when one pair of lenses has a general front face shape which fits satisfactorily with the frame openings and/or with their rims, the processing means are further arranged for determining respective shapes of rear faces of this pair of lenses, for example according to the comfort criterion. It can be usefully referred to document WO2007/017766 published in the name of the Applicant for finding details of a method for determining a lens rear face shape when the front face shape has already been defined.

The present invention is also aimed at a computer program product, stored in a computer system memory or on a removable medium able to cooperate with a computer reader, and comprising instructions for running the steps of the method within the sense of the invention, as described above for example with reference to FIG. 4.

Figure 7:
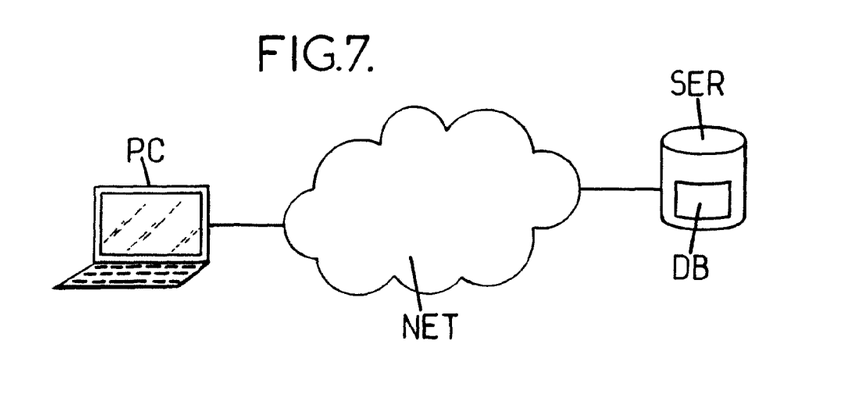
FIG. 7 schematically shows a computer system in an embodiment of the invention.

The present invention is also aimed at a computer system as shown by way of an example in FIG. 7 and comprising, in a particular embodiment, a memory storing a database DB including a multiplicity of data sets related to a plurality of spectacle frame models and sizes, the aforesaid second data set F2 being selected amongst the multiplicity of data sets according to a choice of the wearer. The database can be updated according the feedbacks of the opticians who could mount selected lenses on chosen frames or on new frame models.

In the example of FIG. 7, the system comprises a server SER and at least one computer entity PC at the disposal of the optician and linked to the distant server SER via a network NET (such as the Internet). The computer entity may comprise thus, in this embodiment, means such as an interface for inputting the first and second data sets and for sending these data sets to the server SER. The server SER is provided with processing means for outputting, on the basis of the first and second sets, at least one data set characterizing a pair of spectacle lenses adapted to the wearer w and the chosen frame F.

The present invention also aims at the server SER of the computer system, which may comprise thus a memory storing a computer program for implementing the method of the invention.

Once the suitable lenses are validated and selected by the optician through his computer entity PC, an identifier of the selected lenses is sent through the network to the server SER and the server establishes a computer order form identifying the selected lenses and indicating their edging features. Then, this computer document is sent to a lens provider.

Of course, the present invention is not limited to the embodiment described hereinabove by way of example; it extends to other variants.

For example, it will be understood that the scope of the invention is not limited to the selection of a pair of lenses. As a matter of fact, a single lens can also be provided according to at least one criterion. In an embodiment, the replacement of a single lens to be mounted on pre-existing spectacles can be provided according to the method of the invention. The criterion to input in the system would be thus the comfort criterion and the selected lens would have the same features as the former one to be replaced.

The invention claimed is:
1. A non-transitory computer program product encoded with instructions executable by a computer system for choosing pairs of ophthalmic lenses of spectacles adapted to a future wearer of said spectacles, wherein the instructions comprise the steps of:

inputting at an input interface of the computer system a first set of data related to the wearer, said first set of data comprising at least a prescription of said wearer, and a second set of data related to a spectacle frame chosen by the wearer, determining, by a processor of the computer system based on the second set of data, front face general curvatures of first and second openings of the spectacle frame, determining, by the processor based at least on the first set of data and on the previously determined front face general curvatures, a plurality of sets of data relative to pairs of ophthalmic lenses adapted to said wearer and said spectacle frame, inputting, at the input interface, at least two criterions for choosing said pair of ophthalmic lenses, the criterions being inputted with respective weights, selecting, by the processor, amongst the plurality of sets of data relative to possible pairs of ophthalmic lenses, a list of data sets characterizing pairs of ophthalmic lenses which best suit said criterions taking into consideration their respective weights, outputting, at an output interface of the computer system, said list of data sets, wherein one of said at least two criterions is a comfort provided by said ophthalmic lenses and another is an aesthetics of the spectacles provided with said ophthalmic lenses, wherein, with the first and second ophthalmic lenses being intended to be mounted on respective first and second openings of the chosen spectacle frame, the selecting step consists in selecting, amongst the plurality of sets of data relative to possible pairs of ophthalmic lenses which best suit the comfort criterion, a list of data sets characterizing pairs of first and second ophthalmic lenses having respective front face general curvatures fitting with respective front face general curvatures of said first and second openings, and wherein the list of data sets characterizing pairs of ophthalmic lenses which best suit the best said criterions is sorted according at least to said criterions.

2. A method implemented by a computer system, for choosing pairs of ophthalmic lenses of spectacles adapted to a future wearer of said spectacles, wherein the method comprises the steps of:

inputting at an input interface of the computer system a first set of data related to the wearer, said first set of data comprising at least a prescription of said wearer, and a second set of data related to a spectacle frame chosen by the wearer, determining, by a processor of the computer system based on the second set of data, front face general curvatures of first and second openings of the spectacle frame, determining, by the processor based at least on the first set of data and on the previously determined front face general curvatures, a plurality of sets of data relative to pairs of ophthalmic lenses adapted to said wearer and said spectacle frame, inputting, at the input interface, at least two criterions for choosing said pair of ophthalmic lenses, the criterions being inputted with respective weights, selecting, by the processor, amongst the plurality of sets of data relative to possible pairs of ophthalmic lenses, a list of data sets characterizing pairs of ophthalmic lenses which best suit said criterions taking into consideration their respective weights, outputting, at an output interface of the computer system, said list of data sets, wherein one of said at least two criterions is a comfort provided by said ophthalmic lenses and another is an aesthetics of the spectacles provided with said ophthalmic lenses, wherein, with the first and second ophthalmic lenses being intended to be mounted on respective first and second openings of the chosen spectacle frame, the selecting step consists in selecting, amongst the plurality of sets of data relative to possible pairs of ophthalmic lenses which best suit the comfort criterion, a list of data sets characterizing pairs of first and second ophthalmic lenses having respective front face general curvatures fitting with respective front face general curvatures of said first and second openings, and wherein the list of data sets characterizing pairs of ophthalmic lenses which best suit the best said criterions is sorted according at least to said criterions.

3. A method implemented by a computer system, for choosing pairs of ophthalmic lenses of spectacles adapted to a future wearer of said spectacles, wherein the method comprises the steps of:

inputting at an input interface of the computer system a first set of data related to the wearer, said first set of data comprising at least a prescription of said wearer, and a second set of data related to a spectacle frame chosen by the wearer, determining, by a processor of the computer system based on the second set of data, front face general curvatures of first and second openings of the spectacle frame, determining, by the processor based at least on the first set of data and on the previously determined front face general curvatures, a plurality of sets of data relative to pairs of ophthalmic lenses adapted to said wearer and said spectacle frame, inputting, at the input interface, at least two criterions for choosing said pair of ophthalmic lenses, the criterions being inputted with respective weights, selecting, by the processor, amongst the plurality of sets of data relative to possible pairs of ophthalmic lenses, a list of data sets characterizing pairs of ophthalmic lenses which best suit said criterions taking into consideration their respective weights, outputting, at an output interface of the computer system, said list of data sets, wherein one of said at least two criterions is an aesthetics of the spectacles provided with said ophthalmic lenses, wherein, with the first and second ophthalmic lenses being intended to be mounted on respective first and second openings of the chosen spectacle frame, said first and second openings having an inner circumferential surface comprising respective first and second rims, the method further comprises determining, on the basis of said second set of data, respective offsets of said first and second rims relative to said first and second openings, wherein the selecting step consist in selecting a list of data sets characterizing pairs of first and second ophthalmic lenses having front face edges abutting with respective front faces of said first and second rims, and wherein the list of data sets choosing pairs of ophthalmic lenses which best suit said criterions is sorted according at least to said criterions.

4. A method implemented by a computer system, for choosing pairs of ophthalmic lenses of spectacles adapted to a future wearer of said spectacles, wherein the method comprises the steps of:

inputting at an input interface of the computer system a first set of data related to the wearer, said first set of data comprising at least a prescription of said wearer, and a second set of data related to a spectacle frame chosen by the wearer, determining, by a processor of the computer system based on the second set of data, front face general curvatures of first and second openings of the spectacle frame, determining, by the processor based at least on the first set of data and on the previously determined front face general curvatures, a plurality of sets of data relative to pairs of ophthalmic lenses adapted to said wearer and said spectacle frame, inputting, at the input interface, at least two criterions for choosing said pair of ophthalmic lenses, the criterions being inputted with respective weights, selecting, by the processor, amongst the plurality of sets of data relative to possible pairs of ophthalmic lenses, a list of data sets characterizing pairs of ophthalmic lenses which best suit said criterions taking into consideration their respective weights, outputting, at an output interface of the computer system, said list of data sets, wherein one of said at least two criterions is a comfort provided by said ophthalmic lenses and another is an aesthetics of the spectacles provided with said ophthalmic lenses, wherein a plurality of ophthalmic lens front face general curvatures are suitable for a same wearer prescription, wherein releasing said constraint related to said comfort criterion enables a choice of a plurality of ophthalmic lens front face shapes, wherein selecting step consists in selecting a list of data sets characterizing pairs of ophthalmic lenses having a front face shape adapted to said spectacle frame for suiting the best said aesthetics criterion, and wherein the list of data sets characterizing pairs of ophthalmic lenses which best suit said criterions is sorted according at least to said criterions.

5. A non-transitory computer program product encoded with instructions executable by a computer system for choosing pairs of ophthalmic lenses of spectacles adapted to a future wearer of said spectacles, wherein the instructions comprise the steps of:

inputting at an input interface of the computer system a first set of data related to the wearer, said first set of data comprising at least a prescription of said wearer, and a second set of data related to a spectacle frame chosen by the wearer, determining, by a processor of the computer system based on the second set of data, front face general curvatures of first and second openings of the spectacle frame, determining, by the processor based at least on the first set of data and on the previously determined front face general curvatures, a plurality of sets of data relative to pairs of ophthalmic lenses adapted to said wearer and said spectacle frame, inputting, at the input interface, at least two criterions for choosing said pair of ophthalmic lenses, the criterions being inputted with respective weights, selecting, by the processor, amongst the plurality of sets of data relative to possible pairs of ophthalmic lenses, a list of data sets characterizing pairs of ophthalmic lenses which best suit said criterions taking into consideration their respective weights, outputting, at an output interface of the computer system, said list of data sets, wherein one of said at least two criterions is an aesthetics of the spectacles provided with said ophthalmic lenses, wherein, with the first and second ophthalmic lenses being intended to be mounted on respective first and second openings of the chosen spectacle frame, said first and second openings having an inner circumferential surface comprising respective first and second rims, the method further comprises determining, on the basis of said second set of data, respective offsets of said first and second rims relative to said first and second openings, wherein the selecting step consist in selecting a list of data sets characterizing pairs of first and second ophthalmic lenses having front face edges abutting with respective front faces of said first and second rims, and wherein the list of data sets choosing pairs of ophthalmic lenses which best suit said criterions is sorted according at least to said criterions.

6. A non-transitory computer program product encoded with instructions executable by a computer system for choosing pairs of ophthalmic lenses of spectacles adapted to a future wearer of said spectacles, wherein the instructions comprise the steps of:

inputting at an input interface of the computer system a first set of data related to the wearer, said first set of data comprising at least a prescription of said wearer, and a second set of data related to a spectacle frame chosen by the wearer, determining, by a processor of the computer system based on the second set of data, front face general curvatures of first and second openings of the spectacle frame, determining, by the processor based at least on the first set of data and on the previously determined front face general curvatures, a plurality of sets of data relative to pairs of ophthalmic lenses adapted to said wearer and said spectacle frame, inputting, at the input interface, at least two criterions for choosing said pair of ophthalmic lenses, the criterions being inputted with respective weights, selecting, by the processor, amongst the plurality of sets of data relative to possible pairs of ophthalmic lenses, a list of data sets characterizing pairs of ophthalmic lenses which best suit said criterions taking into consideration their respective weights, outputting, at an output interface of the computer system, said list of data sets, wherein one of said at least two criterions is a comfort provided by said ophthalmic lenses and another is an aesthetics of the spectacles provided with said ophthalmic lenses, wherein a plurality of ophthalmic lens front face general curvatures are suitable for a same wearer prescription, wherein releasing said constraint related to said comfort criterion enables a choice of a plurality of ophthalmic lens front face shapes, wherein selecting step consists in selecting a list of data sets characterizing pairs of ophthalmic lenses having a front face shape adapted to said spectacle frame for suiting the best said aesthetics criterion, and wherein the list of data sets characterizing pairs of ophthalmic lenses which best suit said criterions is sorted according at least to said criterions.

\* \* \* \* \*